(12) United States Patent
Barford et al.

(10) Patent No.: US 9,680,693 B2
(45) Date of Patent: Jun. 13, 2017

(54) METHOD AND APPARATUS FOR NETWORK ANOMALY DETECTION

(75) Inventors: Paul R. Barford, Madison, WI (US); Jeffery Thomas Kline, Madison, WI (US); Sangnam Nam, Madison, WI (US); David John Plonka, Madison, WI (US); Amos Ron, Madison, WI (US)

(73) Assignee: Wisconsin Alumni Research Foundation, Madison, WI (US)

( * ) Notice: Subject to any disclaimer, the term of this patent is extended or adjusted under 35 U.S.C. 154(b) by 1199 days.

(21) Appl. No.: 12/516,766

(22) PCT Filed: Nov. 29, 2007

(86) PCT No.: PCT/US2007/085894
§ 371 (c)(1),
(2), (4) Date: May 28, 2009

(87) PCT Pub. No.: WO2008/067442
PCT Pub. Date: Jun. 5, 2008

(65) Prior Publication Data
US 2010/0290346 A1 Nov. 18, 2010

Related U.S. Application Data

(60) Provisional application No. 60/867,733, filed on Nov. 29, 2006.

(51) Int. Cl.
*H04L 12/26* (2006.01)
*H04L 12/24* (2006.01)
*H04L 29/06* (2006.01)

(52) U.S. Cl.
CPC .......... *H04L 41/064* (2013.01); *H04L 41/142* (2013.01); *H04L 63/1425* (2013.01); *H04L 43/045* (2013.01); *H04L 43/16* (2013.01)

(58) Field of Classification Search
CPC ..... H04L 41/064; H04L 41/142; H04L 43/16; H04L 43/045; H04L 63/1425
USPC .......................................................... 370/242
See application file for complete search history.

(56) References Cited

U.S. PATENT DOCUMENTS

| | | | |
|---|---|---|---|
| 6,715,084 B2* | 3/2004 | Aaron et al. | 726/23 |
| 7,016,401 B1* | 3/2006 | Smith et al. | 375/222 |
| 2003/0097595 A1* | 5/2003 | Partridge et al. | 713/201 |
| 2004/0025044 A1* | 2/2004 | Day | 713/200 |
| 2006/0020924 A1 | 1/2006 | Lo | |
| 2006/0047807 A1 | 3/2006 | Magnaghi | |

(Continued)

OTHER PUBLICATIONS

Barford, Paul, et al., A Signal Analysis of Network Traffic Anomalies, Proceedings of ACM SGICOMM Internet Measurement Workshop 2002, pp. 1-12, New York, NY, USA.

(Continued)

*Primary Examiner* — Luat Phung
(74) *Attorney, Agent, or Firm* — Boyle Fredrickson, S.C.

(57) ABSTRACT

A network anomaly detector evaluates two complementary measurements of network statistics, a time variation and correlation among those statistics, to provide an extremely robust detection of network anomalies. In one embodiment, the variability and correspondence are compared against historically derived thresholds to provide for a system that accommodates to local network conditions and evolving network qualities.

15 Claims, 3 Drawing Sheets

(56) References Cited

U.S. PATENT DOCUMENTS

2007/0283436 A1* 12/2007 Duffield et al. ................ 726/23
2009/0265784 A1* 10/2009 Waizumi et al. ............... 726/23

OTHER PUBLICATIONS

Bertsch, Andreas, PCT International Search Report for PCT/IS2007/08594, May 26, 2008, European Patent Office, Rijswijk, Netherlands.
Sastry, Challa S., et al., Network Traffic Analysis Using Singular Value Decomposition and Multiscale Transforms, Information Sciences, 177 (2007) pp. 5275-5291) (received Mar. 24, 2005, received in revised form Jun. 23, 2006, accepted Jul. 3, 2006), Elsevier, ScienceDirect (online), Amsterdam, The Netherlands.
Lakhina A. et al., Disagnosing Network-Wide Traffic Anomalies, Computer Communication Review, SIGCOMM'04, Aug. 30-Sep. 2, 2004, Portland, Oregon, vol. 24, No. 4, pp. 219-230, Oct. 1, 2004, ACM, New York, NY, USA.

* cited by examiner

METHOD AND APPARATUS FOR NETWORK ANOMALY DETECTION

CROSS-REFERENCE TO RELATED APPLICATIONS

This application claims the benefit of PCT Application No. PCT/US07/85894, filed Nov. 29, 2007, and U.S. provisional application 60/867,733, filed Nov. 29, 2006, which are hereby incorporated by reference.

STATEMENT REGARDING FEDERALLY SPONSORED RESEARCH OR DEVELOPMENT

This invention was made with United States government support awarded by the following agencies: NIH GM072000 and NSF 0085984. The United States government has certain rights in this invention.

BACKGROUND OF THE INVENTION

The present invention relates to monitoring the transmission of network data, for example, on the Internet, and, particularly to, a monitoring system that provides improved detection of network anomalies.

Computer networks, such as the Internet, transmit data among computers over a variety of different communication media (e.g., electrical cable, fiber optic cable) joined together by different network switches or routers. Common data transmission protocols, such as TCP/IP, break the data into discrete packets individually routed and assembled at the destination. The data may be from any source that may be converted to a digital form, including text, video and audio material.

With the world's increased reliance on the Internet as a communications link, the monitoring of computer networks, to ensure their proper operation and to respond rapidly to network problems, has become increasingly important. Of particular concern, is the accurate and prompt detection of network "anomalies", that is, unusual network activity that may signal a problem. Network anomalies may reflect malicious activity such denial of service attacks, where a flood of data packets is directed against a given network node to block its normal function or a broad scale interrogation of a network by a system looking for weaknesses in the network that could be exploited. Network anomalies may also reflect innocent activities that should nevertheless be monitored, including "flash crowd" events occurring because of unexpected and episodic demand for particular data, for example, an unexpectedly popular sporting event sourced from one server to many subscribers, or "node failures" including generally network hardware, network media, or network software causing a significant shift in network traffic and network capacity.

Traffic on particular portions of a network may be monitored by network administrators using a variety of tools allowing automatic and manual monitoring of data collected, for example, from Simple Network Management Protocol (SNMP) queries and "IP flow monitors". SNMP queries obtain data from network nodes, such as routers, and consist mostly of counts of activity, such as the number of packages transmitted over the node. IP flow monitors provide higher level information about network traffic including the source and/or destination of the data packets, for example, to identify the relationships of packets into logical messages or sessions.

Automating the process of detecting network anomalies is important because of the large amount of network data and the impracticality of constant human monitoring of network events. Nevertheless, this automation process is difficult, particularly given the high variability of normal network traffic. Simple thresholding techniques, when adjusted to limit "false positive" detections, may be unable to detect important anomalies that make minor changes in fundamental network statistics. The use of more complex models, for example, neural nets that model normal network behavior, run the risk of bias toward "known" anomalies at the expense of important unknown or unexpected anomalies. Highly sophisticated automated detection techniques that require large amounts of data storage or computer power, may be impractical for routine network analysis.

SUMMARY OF THE INVENTION

The present invention provides a network anomaly detector that combines two simple and robust detection techniques. The first technique looks at the variability of the network statistics. This approach comports with the intuition that a network anomaly represents a change over time in normal network operation. The second technique looks for change in the interrelationship between multiple time measures of the network. This approach follows the intuition that a network anomaly represents an "unbalance" in network operation. These two complimentary approaches balance "local" fast response detection with a "global" longer-horizon detection to provide an accurate detection of network anomalies that is resistant to false alarms.

Specifically then, the present invention provides a network traffic anomaly detector having a network interface that may be connected to a network to be monitored to extract multiple, time-series, and network statistics. A first analyzer receives the network traffic statistics to characterize a variability of the network traffic statistics, while a second analyzer receives the network traffic statistics to characterize a correspondence between the different network traffic statistics. A detection unit receives the variability and correspondence characterizations to provide an output indicating a likelihood of the network anomaly.

It is thus a feature of at least one embodiment of the invention to provide a simple but accurate network anomaly detector by combining two complementary detection techniques.

The first analyzer may be a wavelet analyzer performing a wavelet decomposition of the network statistics.

It is an additional feature of at least one embodiment of the invention to provide a sophisticated measure of variability at a range of time scales.

The characterizations of variability may be based on variations across coefficients of each wavelet decomposition.

It is thus a feature of at least one embodiment of the invention to provide a compact representation of variability over multiple time scales.

The detection unit may operate to equate greater variability with increased likelihood of a network anomaly.

It is thus a feature of at least one embodiment of the invention to provide a detection system that is consistent with the intuitive sense that anomalies represent abrupt changes in network statistics.

The second analyzer may evaluate the correlation between multiple network traffic statistics.

It is thus a feature of at least one embodiment of the invention to provide a system that may detect network anomalies manifest in evolving imbalances in the network.

The second analyzer may evaluate how successfully different time series of multiple network traffic statistics can be expressed in a single time series, for example, as generated by a singular value decomposition.

Thus, it is a feature of at least one embodiment of the invention to provide a sophisticated method of quantifying a deviation among different network statistics from their normal interrelationships.

The detection unit may operate to equate lesser correspondence with increased likelihood of a network anomaly.

Thus, it is an important feature of at least one embodiment of the invention to provide a system that exploits the intuition that a de-correlation of network statistics may signal an underlying network anomaly.

The network interface may extract the network statistics in pairs of "symmetrical counts" that structurally tend to be proportionally related. For example, the counts may be packet-rate and bit-rate statistics which tend to move together, or the counts may be incoming traffic rate (bits or packets) and outgoing traffic rate which tend to move together.

Thus it is a feature of at least one embodiment of the invention to provide a system that is sensitive to imbalance in naturally symmetrical measurements, such as may indicate underlying anomalies.

The first and second analyzers may use different time windows of analysis, and the time window of the second analyzer may be longer than the time window of the first analyzer.

Thus, it is a feature of at least one embodiment of the invention to provide an anomaly detector that may be simultaneously sensitive to different time scales.

The anomaly detector may include a first analyzer that uses a time window of less than five minutes and preferably on the order of one minute or less.

It is thus an feature of at least one embodiment of the invention to provide a system that is sensitive to extremely short time window anomalies such as appear to represent an important class of network anomalies without creating an obscuring level of false positive anomaly indications. The balancing of variability and correspondence provides a system robust against false triggering even with extremely short time windows.

The detector may further include a database providing a rolling historical measure of variability and correspondence and the detector unit may further compare current characterizations of variability and correspondence to the historical measurements to detect an anomaly.

Thus, it is a feature of at least one embodiment of the invention to provide a system that may easily be adapted to heuristic behavior to automatically learn what is normal behavior for any given network. It is another feature of this embodiment of the invention to provide a heuristic system using compact historical descriptions of network behavior that may be practically stored and processed.

The comparison may evaluate how likely it is that the current characterization of the network (e.g., variability and correspondence) would have been in the historical data set.

It is thus a feature of at least one embodiment of the invention to provide a system that provides a dynamic definition of what is anomalous behavior.

The traffic anomaly detector may be software running on a network switch device.

Thus, it is a feature of at least one embodiment of the invention to provide a system that is computationally and data storage efficient such as could be practically placed in a network node.

These particular features and advantages may apply to only some embodiments falling within the claims and thus do not define the scope of the invention.

DETAILED DESCRIPTION OF THE PREFERRED EMBODIMENT

Figure 1:
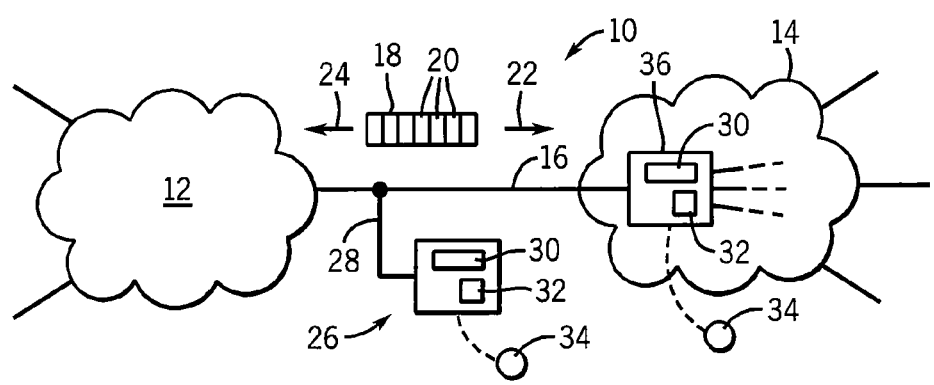
FIG. 1 is a simplified diagram of a computer network showing two possible embodiments of the network analyzer of the present invention, either as a stand-alone network monitor or as built into a network switch.

Referring now to FIG. 1, a computer network 10, for example the Internet, may include a variety of smaller networks 12 and stub networks 14 joined by one or more network lines 16. A typical network line 16 may be, for example, an IEEE 802.1q gigabyte Ethernet trunk.

The network line 16 may communicate data packets 18 between the networks 12 and 14, both in an incoming direction 22 from network 12 to network 14 and in an outgoing direction 24 from network 14 to network 12. Each packet 18 is comprised of variable numbers of bits 20.

A standalone network monitor 26 may provide a tap 28 connecting the standalone network monitor 26 to the network line 16 to read the packets 18 transmitted thereon. The standalone network monitor 26 may include a dedicated processor 30 operating to execute a stored program 32 to implement the network traffic anomaly detector of the present invention and to provide an alert output 34 to an operator or response system. The alert output may be associated with the standalone network monitor 26 or may be transmitted to a remote location over the network itself.

In an alternative embodiment, the present invention may be implemented on a network node 36, such as bridge or border router, where the network node 36 provides the processor 30 and stored program 32 to produce the alert output 34.

The standalone network monitor 26 or network node 36 may, for example, be a dedicated computer running a dual Intel Xeon processor with an Endace DAG4.3GE network monitoring card and multiple SCSI disks.

Figure 2:
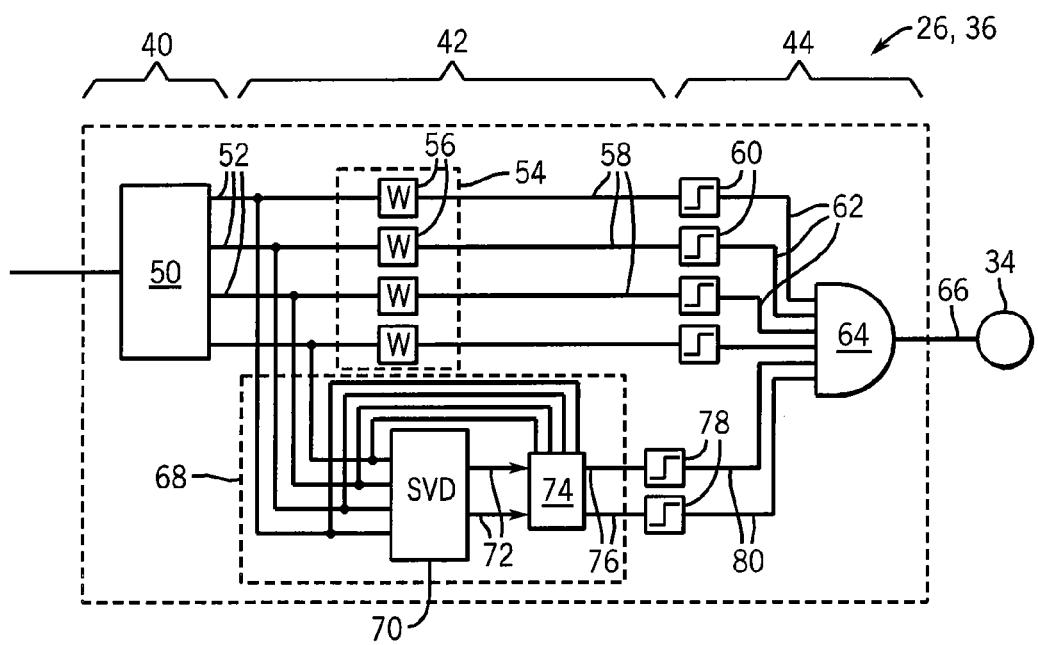
FIG. 2 is a block diagram of the principal components of both embodiments of the network analyzer of FIG. 1 providing signal extraction, transformation and detection components, the transformation component providing both independent variability and correspondence analysis.

Referring now to FIG. 2, the stored program 32, which may be either software or firmware or a combination of both, provides a network anomaly detector having three logical sections: a first extraction section 40 extracting data from the network; a transformation section 42 transforming the extracted data; and a detector section 44 analyzing the transformed data to determine whether an anomaly has been presented.

The extraction section 40 includes extractor unit 50 which operates to read each or a given percentage of the packets 18 to extract fundamental statistics over a given time window and to provide those statistics as a time series of data. In the preferred embodiment the statistics are incoming packet count, being a count of the incoming packets 18 during the time window, outgoing packet count, being a count of the outgoing packets 18 during the time window, incoming bit count, being a count of bits 20 of the incoming packets 18 during the time window, and outgoing bit count, being a count of the bits 20 of the outgoing packets 18 during the time window. The extraction section 40 may, for example, use DAG driver software version 2.5.3 release 1 and a patched version of NeTraMet software, version 5.1 beta 9 to extract these counts with a time window of one second.

Figure 3:
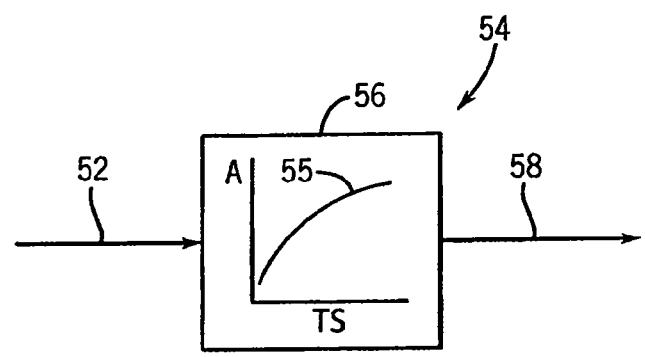
FIG. 3 is an expanded block diagram of a wavelet transform block used in the variability analysis of FIG. 2.

Referring also to FIG. 3, the four time series signals 52 representing the counts extracted by the extraction section 40 are next provided to a variability analyzer 54 analyzing how the statistics vary in time. In a preferred embodiment, the variability analyzer 54 provides a wavelet transform unit 56 operating independently on each signal 52 to decompose the signal 52 into a set of basis wavelets of different time scales to provide a function 55 defining a wavelet component amplitude versus a time scale of the wavelet component.

The general slope of this function 55 provides a variability output 58 which indicates the variability across wavelet time scales such that the greater the slope of function 55 as one moves from small time scales to large time scales (and thus the greater the variability output 58), the greater the "smoothness" of the given time series signals 52 in time.

The variability outputs 58 for each time series signal 52 are provided to threshold detector 60 comparing the variability outputs 58 to empirically determined threshold values to produce binary outputs 62. The threshold detectors 60 operate so that the binary outputs 62 have a logical TRUE or "high" output when there is relatively high variability in the time series signals 52 or low smoothness and a logical FALSE or "low" output when there is relatively high smoothness and low variability in the time series signals 52 such as suggests normal operation of the network.

Referring still to FIG. 2, the four time series signals 52 representing the counts extracted by the extraction section 40 are also provided to a correspondence analyzer 68 analyzing the correspondence among the different time series signals 52. In a preferred embodiment, each of the time series signals 52 is processed by a singular value decomposition block 70 which extracts two Eigen values 72 from the four signals 52. The Eigen values 72 capture underlying functional relationships between the time series signals 52, for example, the probable correspondence between incoming and outgoing data in a normally functioning network, and between packets and bits in a normally functioning network.

Failure of the Eigen values 72 to accurately distill the essential quality of the time series signals 52, for example, as reflected in an inability to reconstruct the time series signals 52 from the Eigen values 72, indicates a lack of correspondence or correlation between the time series signals 52 and is detected by an error calculator 74. The error calculator 74 receives the time series signals 52 and the Eigen value 72 to provide correspondence outputs 76 for each Eigen value 72.

The correspondence outputs 76 are provided to threshold detectors 78 similar to threshold detectors 60, which provide binary outputs 76 having a Boolean TRUE state when there is low correspondence among the time series signals 52, and a Boolean FALSE state when there is high correspondence.

The outputs 62 from threshold detectors 60 associated with the variability analyzer 54 and the outputs 76 from the threshold detectors 78 associated with the correspondence analyzer 68 are provided to a logical AND-gate 64 whose output 66 provides alert output 34 indicating a network anomaly. Thus, it will be understood that false positive indications of a network anomaly are reduced by the fact that each of the outputs of the threshold detectors 60 and threshold detectors 78 must be high before an anomaly is indicated. Note that this process reduces the sensitivity to increases in variability in cases where the correspondence remains high and reduced sensitivity to loss of correspondence when variability remains low.

Figure 4:
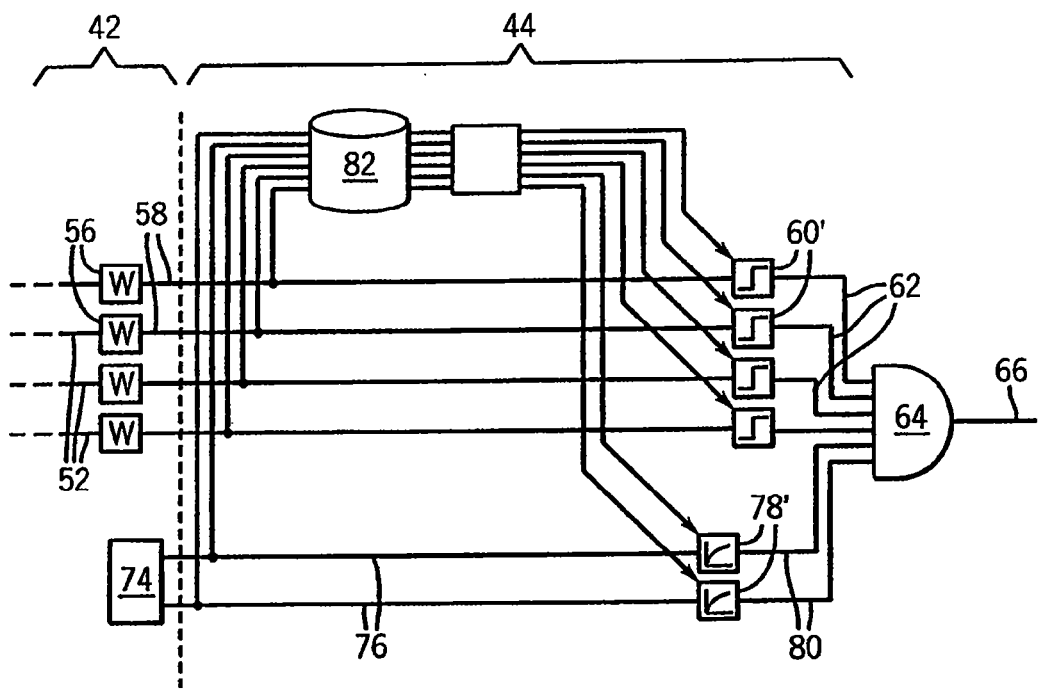
FIG. 4 is an alternative embodiment of the detection stage of FIG. 2 showing a heuristic detection system that provides a definition of anomalous network behavior using historical data.

Referring now to FIG. 4, in an alternative embodiment, the detector section 44 described above, may be modified so that the threshold values applied to the threshold detectors 60 and 78 change over time so that new definitions of normal network behavior may be "learned". This heuristic thresholding process collects the variability outputs 58 and correspondence outputs 76 into a database 82 on a rolling basis. In a current embodiment, a previous four months of data may be collected. Note that the variability outputs 58 and correspondence outputs 76 are relatively compact (compared to a full capture of network traffic) thus allowing this database to be readily collected and stored on a server. Further, as will be described, this data is aggregated into a limited number of "bins" reflecting regular divisions of the day, further reducing the amount of data storage.

Figure 5:
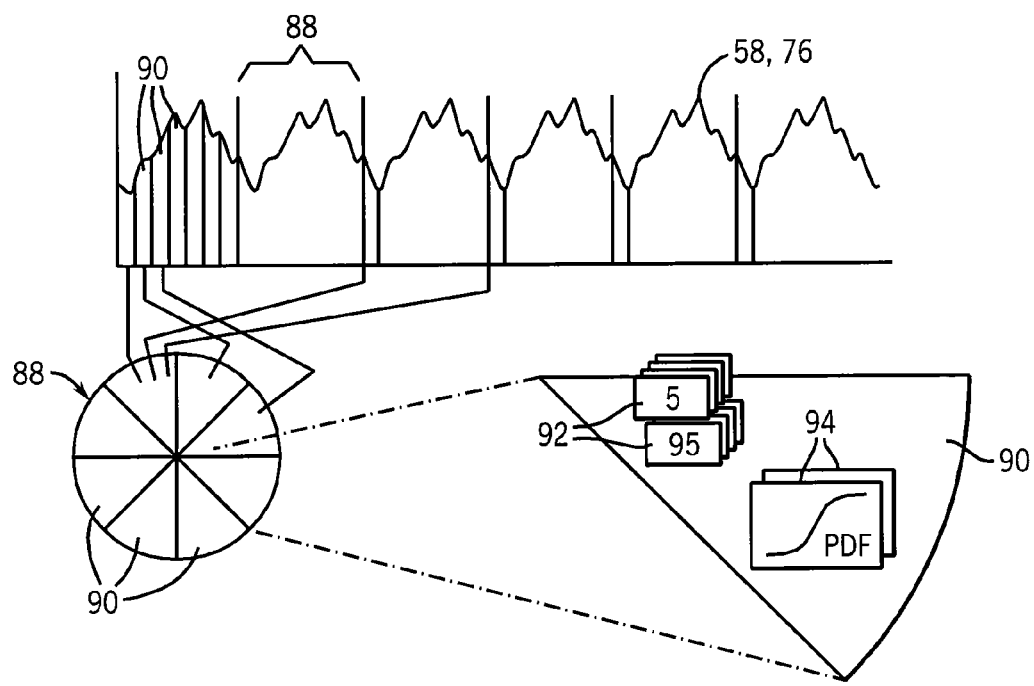
FIG. 5 is a graphical representation of historical data used in the embodiment of FIG. 4 showing time-binned statistical thresholds and probability distribution functions.

Referring also to FIG. 5, in this data storage process, as new variability outputs 58 or correspondence outputs 76 are calculated, they are sorted into pre-identified periods 90 dividing each day 88, for example, into sixteen equal length periods 90 each day 88. Within each period 90, the data is aggregated, reducing data storage requirements.

For the variability outputs 58, the data is aggregated with data from the rolling previous four months of data of this period 90 to calculate a $5^{th}$ and $95^{th}$ percentile of the aggregated variability data for each time series signal 52. These percentile values are stored in data elements 92 associated with each period 90. Referring to FIG. 4, threshold detectors 60' read these data elements 92 to generate a threshold value that produces FALSE binary outputs 62 if the current variability output 58 is between the $5^{th}$ and $95^{th}$ percentile values of data elements 92 of FIG. 5 and produces TRUE binary outputs 62 if the current variability output 58 is outside the $5^{th}$ and $95^{th}$ percentile values.

Figure 6:
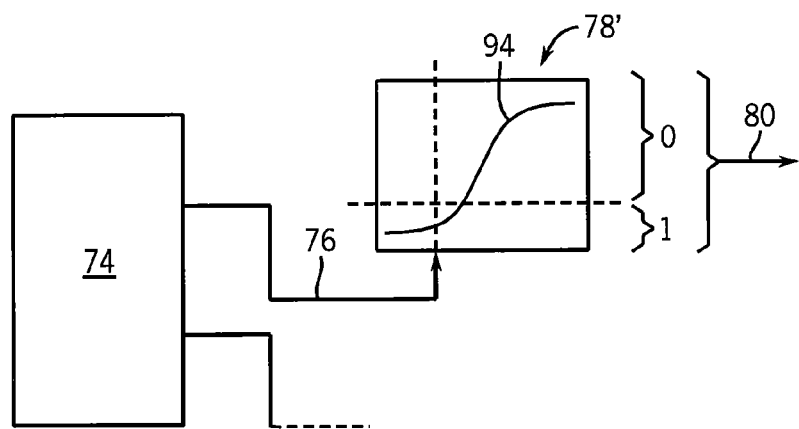
FIG. 6 is a detailed block diagram of thresholding blocks of FIG. 4 showing application of the correspondence statistics to the probability density functions collected per FIG. 5.

For the correspondence outputs 76, the data is aggregated with data from the rolling previous four months of data of this period 90 to collect a probability density function 94. The storage requirements for the probability density function 94 may be further decreased by discretizing the probability values into four categories of the intervals 0 to 0.7, 0.7-0.8, 0.8-0.92, and 0.92-1. Referring to FIG. 6, each correspondence output 76 from the error calculator 74 is provided to a threshold detector 78' which generates a threshold based on the probability density function 94 and a predetermined probability threshold. Specifically, each correspondence output is applied to the probability density function 94 to obtain a probability and that probability is compared to the predetermined threshold ($1 \times 10^{-4}$ in the preferred embodiment) to produce FALSE binary output values 80 if the current correspondence output 76 results in a probability of greater than the predetermined threshold and produces TRUE binary output values 80 if the current correspondence output 76 results in a probability of less than the predetermined threshold.

Thus, an anomaly is indicated if the correspondence drops below the historically observed correspondence according to a threshold. In this process, even though fixed thresholds are established, it will be understood that the threshold will vary to reflect evolution of fundamental network statistics.

It is specifically intended that the present invention not be limited to the embodiments and illustrations contained herein, but include modified forms of those embodiments including portions of the embodiments and combinations of elements of different embodiments as come within the scope of the following claims.

We claim:

1. A network traffic anomaly detector comprising:
   a network interface connecting to a network to be monitored to extract multiple network traffic statistics, each as a time series, the network statistics being extracted by performing a count over a time window of a given type of network activity at a given location;
   a first analyzer receiving the network traffic statistics to characterize a variability with respect to time of the network traffic statistics;
   a second analyzer receiving the network traffic statistics to characterize a correspondence with respect to time between different network traffic statistics, the correspondence reflecting a statistical dependence between the different network statistics; and
   a detection unit receiving the variability and correspondence characterizations from the first and second analyzer to provide an output indicating a likelihood of a network anomaly
   wherein the network traffic statistics include at least two different measures of rates of data flow on the network,
   wherein the network interface extracts network traffic statistics in pairs of symmetrical counts that structurally tend to be proportionally related.

2. The network traffic anomaly detector of claim 1 wherein the first analyzer is a wavelet analyzer performing a wavelet decomposition of the network statistics.

3. The network traffic anomaly detector of claim 2 wherein the characterization of the variability is based on variations across coefficients of each wavelet decomposition.

4. The network traffic anomaly detector of claim 1 wherein the detection unit operates to equate greater variability with increased likelihood of a network anomaly.

5. The network traffic anomaly detector of claim 1 wherein the second analyzer evaluates a correlation between the multiple network traffic statistics.

6. The network traffic anomaly detector of claim 1 wherein the second analyzer evaluates how successfully different time-series of the multiple network traffic statistics can be expressed in a single time series.

7. The network traffic anomaly detector of claim 6 wherein the single time series is produced by singular value decomposition.

8. The network traffic anomaly detector of claim 1 wherein the detection unit operates to equate lesser correspondence with increased likelihood of a network anomaly.

9. The network traffic anomaly detector of claim 1 wherein the pairs of symmetrical counts are selected from the group consisting of the pair of packet rate and bit rate, and the pair of incoming traffic rate and outgoing traffic rate.

10. The network traffic anomaly detector of claim 1 wherein the first and second analyzers use different time windows of analysis and wherein the time window of the second analyzer is longer than the time window of the first analyzer.

11. The network traffic anomaly detector of claim 1 wherein the first analyzer uses a time window of less than 5 minutes.

12. The network traffic anomaly detector of claim 1 wherein the network analyzer is software running on a network switch device.

13. The network traffic anomaly detector of claim 1 further including a database providing a rolling historical measure of variability and correspondence and wherein the detection unit further compares current characterizations of variability and correspondence to the historical measures to detect an anomaly.

14. The network traffic anomaly detector of claim 13 wherein the comparison evaluates the likelihood of the characterizing of the current network statistics occurring in the historical measures.

15. A method of network traffic anomaly detection comprising the steps of:
   (a) connecting to a network to extract multiple network traffic statistics, each as a time series, the network statistics being extracted by performing a count over a time window of a given type of network activity at a given location;
   (b) analyzing the network traffic statistics to characterize a variability with respect to time of the network traffic statistics;
   (c) analyzing the network traffic statistics to characterize a correspondence with respect to time between different network traffic statistics, the correspondence reflecting a statistical dependence between the different network statistics; and
   (d) providing an output indicating a likelihood of a network anomaly based on the variability and correspondence characterizations,
   wherein the network traffic statistics include at least two different measures of rates of data flow on the network,
   wherein the network interface extracts network traffic statistics in pairs of symmetrical counts that structurally tend to be proportionally related.

* * * * *